(12) United States Patent
DeVay

(10) Patent No.: US 6,248,387 B1
(45) Date of Patent: Jun. 19, 2001

(54) PSYLLIUM ENRICHED BAKED SNACK FOODS

(75) Inventor: Gwen DeVay, Battle Creek, MI (US)

(73) Assignee: Kellogg Company, Battle Creek, MI (US)

( * ) Notice: Subject to any disclaimer, the term of this patent is extended or adjusted under 35 U.S.C. 154(b) by 0 days.

(21) Appl. No.: 09/435,329

(22) Filed: Nov. 5, 1999

Related U.S. Application Data
(60) Provisional application No. 60/107,250, filed on Nov. 5, 1998.

(51) Int. Cl.⁷ ........................................................ A21D 2/36
(52) U.S. Cl. ............................................. 426/550; 426/560
(58) Field of Search .................................... 426/808, 615, 426/622, 629, 549, 550, 560

(56) References Cited

U.S. PATENT DOCUMENTS

| | | | |
|---|---|---|---|
| 4,849,222 | 7/1989 | Broaddus | 424/195.1 |
| 4,873,093 | 10/1989 | Fazzolare et al. | 426/28 |
| 5,223,298 | 6/1993 | Wullschleger et al. | 426/549 |
| 5,227,248 | 7/1993 | Wullschleger et al. | 426/549 |
| 5,236,733 * | 8/1993 | Zimmerman et al. | 426/611 |
| 5,384,136 | 1/1995 | Lai et al. | 426/19 |
| 5,500,240 | 3/1996 | Addesso et al. | 426/560 |

\* cited by examiner

*Primary Examiner*—Keith Hendricks
(74) *Attorney, Agent, or Firm*—Howard & Howard

(57) ABSTRACT

Baked snack products containing psyllium, methods for their preparation and methods for lowering serum cholesterol therewith are disclosed.

12 Claims, No Drawings

PSYLLIUM ENRICHED BAKED SNACK FOODS

This application claims priority to Provisional U.S. application 60/107,250, filed Nov. 5, 1998.

FIELD OF THE INVENTION

The present invention relates to snack foods containing psyllium and methods for producing the snack products.

BACKGROUND OF THE INVENTION

Psyllium is a known mucilaginous material derived from seeds from the plants of the Plantago genus, which is grown in certain sub-tropical regions of the world. The seeds are dark brown, smooth, boat shaped and shiny. Psyllium is an excellent source of both soluble and insoluble fibers and has a proven cholesterol-lowering effect. In addition to its cholesterol lowering effects, psyllium is well known for its bulk laxative effect. Psyllium seed is used in whole, ground or dehusked form to make a variety of psyllium containing products, including cookies, laxative drink mixes, and other foodstuffs.

Psyllium is mucilagenous in nature and acquires a slimy or adhesive texture and mouthfeel upon hydration. This slimy mouthfeel is unpalatable and, accordingly, various additives have been incorporated in psyllium-containing ingestible compositions to mask the undesirable texture and mouthfeel of psyllium. In addition, psyllium develops a distinctive, undesirable flavor and color in the presence of heat and moisture which further limits its use in food products.

The mucilagenous nature of psyllium husks and of soluble fibers in general presents grave processing difficulties and there have been numerous prior attempts to produce palatable food products. Difficulties notwithstanding, the desirable therapeutic effects provided by psyllium have led to many prior psyllium-containing formulations. For example, various psyllium containing foodstuffs have been proposed which purport to take advantage of the natural digestion regulation properties of psyllium, or the satiating effect of psyllium. See, for example, U.S. Pat. Nos. 3,574,634 and 4,348,379.

It has also been suggested, e.g. in U.S. Pat. No. 3,148,114, that whole psyllium husks, such as the ground husks of the seed *Plantago psyllium*, lower blood cholesterol upon oral administration thereof. U.S. Pat. No. 4,849,222 discloses a medicament composition for reducing blood cholesterol levels in humans and lower animals which comprises a mixture of psyllium seed gum, or a source of psyllium seed gum, and a nonabsorbable, nondigestible polyol polyester.

Prior attempts have been made to overcome the problems of using psyllium in ready-to-eat cereal and bakery products such as cookies. U.S. Pat. No. 5,227,248, hereby incorporated by reference, describes preparation of an extruded psyllium nugget that is incorporated into cereal and baked products such as cinnamon cookies.

Prewetted psyllium and an extruded psyllium nugget have also been used to overcome processing difficulties associated with psyllium, as described, e.g., in U.S. Pat. Nos. 5,384,136; 5,384,144; and 5,223,298.

Psyllium-containing snack foods are very desirable because snack foods provide consumers with a convenient, readily available food source that requires little or no preparation time. Various types of snack products are known in the art. For example, U.S. Pat. No. 5,500,240 to Addesso et al. discloses a chip-like snack prepared by admixing wheat flour, a no or low gluten content starching material such as potato starch, pregelatinized waxy starch and water to form a dough having a tachifier value of 2500 to 4000 gas. The dough is sheeted and cut into pieces which are heated to reduce moisture content to obtain a blistered appearance.

U.S. Pat. No. 4,873,093 to Fazzolore et al. discloses a starch based blistered chip-like product wherein a starch and water composition is steamed to form a dough-like consistency, wadering the composition forming snack pieces and looking to produce the chip like product.

Psyllium-containing snack foods would provide consumers with a very simple means to obtain the health benefits associated with psyllium and to provide consumers with alternatives to presently available psyllium-containing food products.

It is therefore a principal object of this invention to provide psyllium-containing baked snack products and methods for preparing the snacks that have superior taste and mouthfeel, and are an excellent source of psyllium. A method for the production of the psyllium snack product is also provided herein.

It is also an object of the present invention to provide psyllium containing baked snacks which are palatable and useful for reducing serum cholesterol levels. Additional objects and advantages of the present invention will become apparent from the following detailed description and examples thereof.

SUMMARY OF THE INVENTION

The present invention relates to psyllium-containing snack foods and methods for preparing the same. Preferably, the snacks will contain a sufficient quantity of psyllium in three to four servings daily to provide a cholesterol-reducing effect if ingested by humans and lower mammals (hereinafter referred to generically as mammals), which in humans has been shown to be 7 grams psyllium/day. The psyllium source is psyllium seed husk, preferably 40 mesh raw psyllium.

The snack also contains a starchy material, e.g. potato-based starch source such as potato flakes, corn starch, and the like. It is preferred that the starchy material include at least two different starch sources. A preferred starch for inclusion in the starchy material is pregelatinized waxy corn starch. When ingested, the snack foods effectively reduce the mammalian serum and/or liver cholesterol levels. Other therapeutic effects can also be achieved upon administration of the snack foods, e.g. laxative effects and lowered glycemic index.

Processes for producing the psyllium containing snack products are also provided herein. In a preferred embodiment, at least two starchy materials, e.g., potato starch and pregelatinized starch are dry blended and admixed with water, and, optionally, a suitable oil such as vegetable oil, to form a dough. Psyllium is added to the dough, which is again mixed to achieve a relatively uniform dispersion of the psyllium throughout the dough. Water is added as necessary to produce a suitable dough which is then sheeted, cut into snack-sized pieces, and baked or fried or otherwise heated to obtain a crispy, snack product.

The final products preferably contain a sufficient quantity of soluble fiber in a suitable serving or in several suitable serving amounts to produce desired in-vivo effects upon ingestion by a mammal, including a reduction in serum and liver cholesterol levels.

DETAILED DESCRIPTION

The psyllium-containing baked snack products of the present invention preferably contain from about 75 to about 99% by weight starchy material and from about 1 to about 25% by weight psyllium, and optionally other edible ingredients, e.g., colorants, flavorants, preservatives, leavening and processing aids.

The starchy material preferably includes at least two starch sources. It is preferred that at least one of the starches is a potato-based starch source such as potato flakes, dehydrated potatoes or other potato-derived starch sources. It is also preferred that at least one of the starches is pregelatinized such as pregelatinized corn starch. The final baked snacks of the present invention preferably include from about 50 to about 75% by weight of a potato-based starch source, preferably from about 55 to about 70% by weight, and most preferably from about 60 to about 78% by weight.

The pregelatinized starch, when included, typically accounts for about 1 to about 25% by weight of the final weight of the final product. In preferred embodiments, the pregelatinized starch is included in amounts of from 2 to about 15% by weight, and most preferably from about 5 to about 10% by weight of the final snack product. Any pregelatinized starch may be used in accordance with the present invention. A particularly preferred pregelatinized starch is pregelatinized corn starch commercially available from A.E. Staley Manufacturing Company, Decatur, Ill.

Other starch sources such as wheat flour, oat flour, barley flour, tapioca, corn grits, corn meal, potato granules and other starch products prepared from cereal grain or roots may be used with the present invention. Preferred pregelatinized starches include corn starch, rice starch, barley starch, particularly the waxy varieties of these. A particularly preferred starch component is a mixture of potato flakes and pregelatinized waxy corn starch in a ratio of from about 20:1 to 5:1. To achieve a suitable dough, a sufficient quantity of water must be added such that the dough is not too moist or too dry but is workable under processing conditions. The amount of water to be added will vary with the ingredients used and the amount of psyllium to be included in a given formulation. A sufficient quantity of water is required to achieve a dough that can be sheeted and cut into snack pieces with no or insufficient processing difficulties. The water may be added all at once or in portions. In a preferred embodiment, the dough is formed with the starchy material by adding a portion of the water, and then the water psyllium is added with an additional portion of water. Water may be added as necessary during mixing to maintain the desired properties in the dough.

The psyllium is preferably provided as raw psyllium. Use of raw psyllium to make the snack food of the present invention surprisingly yields an excellent product with little or no processing difficulties when prepared using the process of the invention. It is preferred that the psyllium is ground such that a substantial portion of the psyllium has a particle size range of about 40 mesh (U.S. sieve). A suitable 40 mesh raw psyllium is commercially available from J.B. Laboratories. Preferably, the ratio of starchy material to psyllium by weight of the final product is from about 20:1 to about 10:1, although the ratio will vary with the amount and type of starting materials used. Additionally, the amount of psyllium in the composition will vary with the amount of psyllium to be added and also with the method of preparation, since psyllium competes with other ingredients for available water. The psyllium may be prewetted as described in U.S. Pat. No. 5,384,136 to Lai et al.

The United States Food and Drug Administration (USFDA) has found that a daily intake of 7 grams of soluble fiber from psyllium husk or psyllium seed husk as part of a diet low in saturated fat and cholesterol may reduce the risk of coronary heart disease (CHD) by lowering blood total- and LDL cholesterol levels in individuals with mild to moderate hypercholesterolemia. In view of this finding, the USFDA authorizes placement of a CHD health claim in labeling of foods containing a minimum of 95% pure soluble fiber per Reference Amount Customarily Consumed (RACC, 7 grams divided by 4 eating occasions per day). The USFDA has adopted the terms "psyllium husk" or "psyllium seed husk" to define soluble fiber. It is preferred that the snack food contain a sufficient amount of psyllium such that 3 to 4 serving portions, e.g. one ounce servings, meet this requirement. Sweeteners such as sucrose, dextrose, fructose, aspartame, saccharine and the like may also be included in amounts ranging from 1 to about 10% by weight of the baked snack product. Preferred snack products include about 2 to about 7% by weight sucrose. Flavorants, colorants, processing aids, and other ingredients may be included in aggregate amounts ranging from about 1 to about 25% of the total weight of the baked food product. It is not necessary that these ingredients be added before the product is baked, although many of these ingredients are typically added prior to baking. For example, seasoned oils may be sprayed on after the snack food is baked. Typically, the baked snack product will contain emulsifier such as liquid soy lecithin, leaveners such as ammonium bicarbonate and monocalcium phosphate, seasonings such as barbecue, cheese, onion, vinegar, sour cream, salt, pepper, garlic and the like.

The psyllium containing snack products of the present invention are prepared by admixing the starchy material or the components forming the starchy material, e.g. potato flakes and pregelatinized corn starch together with water to form a dough. Psyllium may be added to the starches prior to addition of the water such that a suitable dough is prepared in a single mixing step. Due to the water-absorbing capacity of psyllium, however, it is preferred that the initial dough be prepared without the psyllium, so that the components making up the starchy material are first dry blended with water being added after dry blending to form a dough, and then psyllium is added with additional water.

The psyllium-containing dough is preferably mixed until the psyllium is uniformly dispersed therein, and preferably has a moisture content ranging from about 25 to about 60% and preferably 30–40%.

After blending, the dough is sheeted to a suitable thickness, e.g. about 1 to 5 mm, preferably about 1.2 to about 3 mm. The dough is then cut to desired shape and heated, e.g. by baking, in an oven, to reduce the moisture content to about 5% by weight or less. In a preferred embodiment, the dough pieces are baked in an oven at a temperature of from about 350 to about 450° F. for about 2 to about 10 minutes to yield the psyllium-containing snack.

The flavorants, seasonings, (if not included in the dough, or if additional amounts are required) and other topical ingredients may then be added be means known in the art, e.g. spraying, sprinkling, or otherwise to attain the desired final product. These may also be added in the dough-forming stage. In preferred embodiments, the baked snack pieces are placed into a rotating drum, sprayed with oil, and then seasoned by adding a powdered seasoning to the oil coated snack pieces while the drum is rotating.

The final baked snack pieces are preferably crisp, have a low degree of friability to provide a long shelf-life and withstand harsh transporting conditions, may be blistered or non-blistered, and the processing steps and amounts and types of ingredients may be varied within the preferred ranges to attain the desired physical properties. Preferably the snack pieces are non-blistered.

The following example is an illustrative embodiment of the present invention.

EXAMPLE 1

A Psyllium enriched baked snack was prepared by mixing the requisite amount of potato flakes, cornstarch, sugar, shortening, leaveners, lecithin and garlic power in a mixer and blending to achieve a relatively uniform mix. While mixing, a sufficient quantity of water was added and mixing was continued until a dough was formed and thoroughly mixed. Once the dough was mixed, the psyllium was added and the dough was mixed until the psyllium is dispersed uniformly throughout the dough. The dough was then transferred into a dough trough and conveyed to the sheeting line. The dough had a moisture content of about 30%.

The dough was then extruded through a sheeter and then through a reduction roller to obtain the desired thickness. The pieces were then cut into two different piece sizes approximating the size and shape of potato chips. The dough trim was returned to the sheeter. The dough pieces were then baked, and the resultant snacks were dried in a dryer to achieve the desired final moisture content of less than 5%.

The baked snack pieces were then transferred to a rotating drum. Inside the rotating drum, oil was sprayed onto the snack pieces and seasoning was added and deposited onto the pieces. The snack pieces were then packaged into a suitable bag. The starting composition used to prepare baked snack pieces is set forth in Table 1 below:

TABLE 1

| Ingredient | Amount (grams) |
| --- | --- |
| Water | 78.33 |
| Potato Flakes | 68.99 |
| Psyllium (40 mesh raw) | 8.55 |
| Staley Corn Starch | 8.28 |
| Seasoning | 4.97 |
| Sugar | 4.97 |
| Partially Hydrogenated Canola Oil | 4.14 |
| Soy Shortening | 1.38 |
| Ammonium Bicarbonate | 0.67 |
| Monocalcium Phosphate | 0.67 |
| Liquid Soy Lecithin | 0.55 |
| Garlic Powder | 0.28 |
| Dextrose | 0.21 |
| Total | 181.99 |

Three flavors of chips were prepared using the above process: sour cream and onion, cheddar cheese and barbecue. The amount of seasoning and the base formula was the same for all three flavors; the only difference was the type of seasoning used. The process yielded non-blistered snack pieces with excellent flavor, texture and overall organoleptic properties.

Many other embodiments of the present invention will be readily apparent to those skilled in the art, and are meant to be within the scope of the claims appended hereto. All references cited herein are incorporated by reference in their entireties.

It is claimed is:

1. A psyllium enriched baked snack food comprising:
   75–99% by weight of a starchy material comprising a potato-derived starch and a pregelatinized starch; and
   1–25% psyllium.

2. The psyllium-enriched baked snack of claim 1, wherein the psyllium is raw psyllium.

3. The psyllium enriched baked snack of claim 1, comprising about 50–75% by weight of the potato-derived starch and about 2–15% by weight of a pregelatinized waxy corn starch.

4. The psyllium enriched baked snack of claim 2, wherein the raw psyllium is 40 mesh raw psyllium.

5. The psyllium enriched baked snack of claim 1 which is non-blistered.

6. A method of preparing a psyllium enriched snack food comprising:
   blending a potato-derived starch with a pregelatinized starch to form a starchy material, admixing from 75 to 99% of the starchy material with from 1 to 25% psyllium and sufficient water to form a dough;
   sheeting the dough,
   cutting the sheeted dough into snack pieces; and
   heating the dough to provide a psyllium enriched snack food having a moisture content of 5% by wt. or less.

7. The method of claim 6, wherein the heated snack pieces are placed in a rotating drum with oil and seasoning and rotated until the seasoning is evenly dispersed thereon.

8. A psyllium enriched baked snack food as recited in claim 1 wherein said pregelatinized starch comprises a pregelatinized waxy starch.

9. A psyllium enriched baked snack food as recited in claim 1 wherein said pregelatinized starch comprises one of a pregelatinized corn starch, a pregelatinized waxy corn starch, a pregelatinized rice starch, a pregelatinized waxy rice starch, a pregelatinized barley starch, or a pregelatinized waxy barley starch.

10. The method of claim 6 further comprising blending a potato-derived starch with a pregelatinized waxy starch to form the starchy material.

11. The method of claim 6 further comprising blending a potato-derived starch with one of a pregelatinized corn starch, a pregelatinized waxy corn starch, a pregelatinized rice starch, a pregelatinized waxy rice starch, a pregelatinized barley starch, or a pregelatinized waxy barley starch to form the starchy material.

12. The method of claim 6 further comprising admixing from 75 to 99% of the starchy material with from 1 to 25% of a prewetted psyllium and sufficient water to form the dough.

* * * * *